United States Patent [19]

Lake, Jr.

[11] Patent Number: 5,289,305
[45] Date of Patent: Feb. 22, 1994

[54] PROGRESSIVE SCAN ARCHITECTURE FOR VIDEO SPECIAL EFFECTS

[75] Inventor: David E. Lake, Jr., Grass Valley, Calif.

[73] Assignee: The Grass Valley Group, Inc., Nevada City, Calif.

[21] Appl. No.: 15,242

[22] Filed: Feb. 5, 1993

Related U.S. Application Data

[63] Continuation of Ser. No. 652,684, Feb. 8, 1991, abandoned.

[51] Int. Cl.$^5$ .............. H04N 5/272; H04N 5/262; H04N 7/01; H04N 9/74
[52] U.S. Cl. .................. 348/578; 348/441; 348/722
[58] Field of Search ............ 358/22, 183, 160, 140, 358/11, 167, 166, 21 R, 105, 13, 185, 180, 182; H04N 9/74, 5/262, 5/272, 7/01

[56] References Cited

U.S. PATENT DOCUMENTS

| | | | |
|---|---|---|---|
| 4,472,732 | 9/1984 | Bennett et al. | 358/22 |
| 4,684,985 | 8/1987 | Nakagaki et al. | 358/140 |
| 4,698,666 | 10/1987 | Lake, Jr. et al. | 358/22 |
| 4,700,232 | 10/1987 | Abt et al. | 358/183 |
| 4,703,447 | 10/1987 | Lake, Jr. | 364/724 |
| 4,782,388 | 11/1988 | Lake | 358/160 |
| 4,791,489 | 12/1988 | Polatnick | 358/160 |
| 4,890,162 | 12/1989 | McNeely et al. | 358/138 |
| 4,899,295 | 2/1990 | Nonweiler | 364/522 |
| 5,065,243 | 11/1991 | Nakagaki | 358/183 |

*Primary Examiner*—Mark R. Powell
*Assistant Examiner*—Safet Metjahic
*Attorney, Agent, or Firm*—John Smith-Hill

[57] ABSTRACT

An enhanced video special effects system architecture is based on deinterlacing (16) incoming fields of interlaced video and processing the deinterlaced video through video special effects operations (18, 30), each of which benefits from operating on a progressive scan video signal rather than an interlaced video signal.

15 Claims, 2 Drawing Sheets

PROGRESSIVE SCAN ARCHITECTURE FOR VIDEO SPECIAL EFFECTS

This is a continuation of application Ser. No. 07/652,684, filed Feb. 8, 1991, and now abandoned.

BACKGROUND OF THE INVENTION

This invention relates to television special effects, and more particularly to an improved architecture for a television special effects generator.

A video image is usually recorded or displayed by sweeping an electron beam horizontally across the face of a camera tube or a picture tube a number of times, from top to bottom, before a vertical retrace is accomplished and the procedure is repeated. The pattern of lines on the face of a camera or picture tube is called a "raster". If the image is created by horizontal lines that are immediately adjacent each other and incrementing downward monotonically, it is known as progressive raster scanning or non-interlaced video.

However, to reduce the bandwidth required for the transmission of the image data while preserving as much resolution as possible, commercial television standards make use of a technique known as "interlace scanning". In this approach, a complete frame of video with full resolution is made of two consecutive fields, each with half as many lines, such that the lines of one field fall between those of the other field. One of these two fields contains, in effect, all of the odd lines of a normal frame of video, while the other contains all of the even lines. The two interlaced fields create an image with an effective sampling rate that is twice that of each field separately, and therefore for a given bandwidth the vertical resolution is doubled relative to each of them separately.

Effective as they are at conserving bandwidth while preserving resolution, interlaced television video signals present a number of problems in modern digital television special effects equipment. A variety of video special effects can cause apparent motion that creates a problem in connection with interlaced video. These include synthetic light reflections, adding borders, defocus effects, key glow generation and mosaic tiling. In each of these operations, apparent motion is introduced into the video image and this apparent motion shows up as undesirable artifacts if the interlaced fields are operated on independently of each other.

Higher quality video special effects systems attempt to use the information from two or more fields to create output images and thus produce images that utilize the full resolution capability of the interlace standard. To avoid distortions produced by motion or apparent motion, these systems adaptively switch between full frame and single field operation, depending on whether motion is detected locally on a pixel by pixel basis.

U.S. Pat. No. 4,472,732 to Bennett et al for a "System for Spatially Transforming Images", hereby incorporated by reference, discloses a video special effects system that includes a deinterlace filter (1332, FIGS. 13 and 18). This filter includes motion detection on a pixel-by-pixel basis that is used to determine the content of an output frame. Motion is detected by comparing a pixel's Y, I and Q values in a most recent field with the values two fields earlier. If these values differ by more than a threshold amount, a motion signal is generated. In the absence of this motion signal, in generating a deinterlaced frame output, the same pixel on the next line will have its value determined by the next most recent field of interlaced video. However, in the presence of this motion signal, the value of the same pixel on the next line is based on the average of the pixels above and below it in the most recent field. Thus, this deinterlace filter produces a progressive scan frame of video in a manner that adaptively filters out field-to-field motion.

In the architecture described in U.S. Pat. No. 4,472,732, the deinterlaced output of the deinterlace filter is filtered and then used immediately in an interpolation process that produces an interlaced output again.

SUMMARY OF THE INVENTION

The quick reversion to interlaced video field taught by U.S. Pat. No. 4,472,732 has the advantage of reducing bandwidth requirements of the video special effects generators that are downstream from the interpolation process. However, by reverting to interlaced fields again so quickly, a major opportunity for an enhanced video special effects system architecture is missed.

According to the present invention, an enhanced video special effects system architecture is based on deinterlacing incoming fields of interlaced video and keeping the video deinterlaced as it is processed with video special effects operations that each benefit from operating on a progressive scan video signal, rather than an interlaced video signal.

The subject matter of the present invention is particularly pointed out and distinctly claimed in the concluding portion of this specification. However, both the organization and method of operation, together with further advantages and objects thereof, may best be understood by reference to the following detailed description and accompanying drawing.

DETAILED DESCRIPTION

Figure 1A:
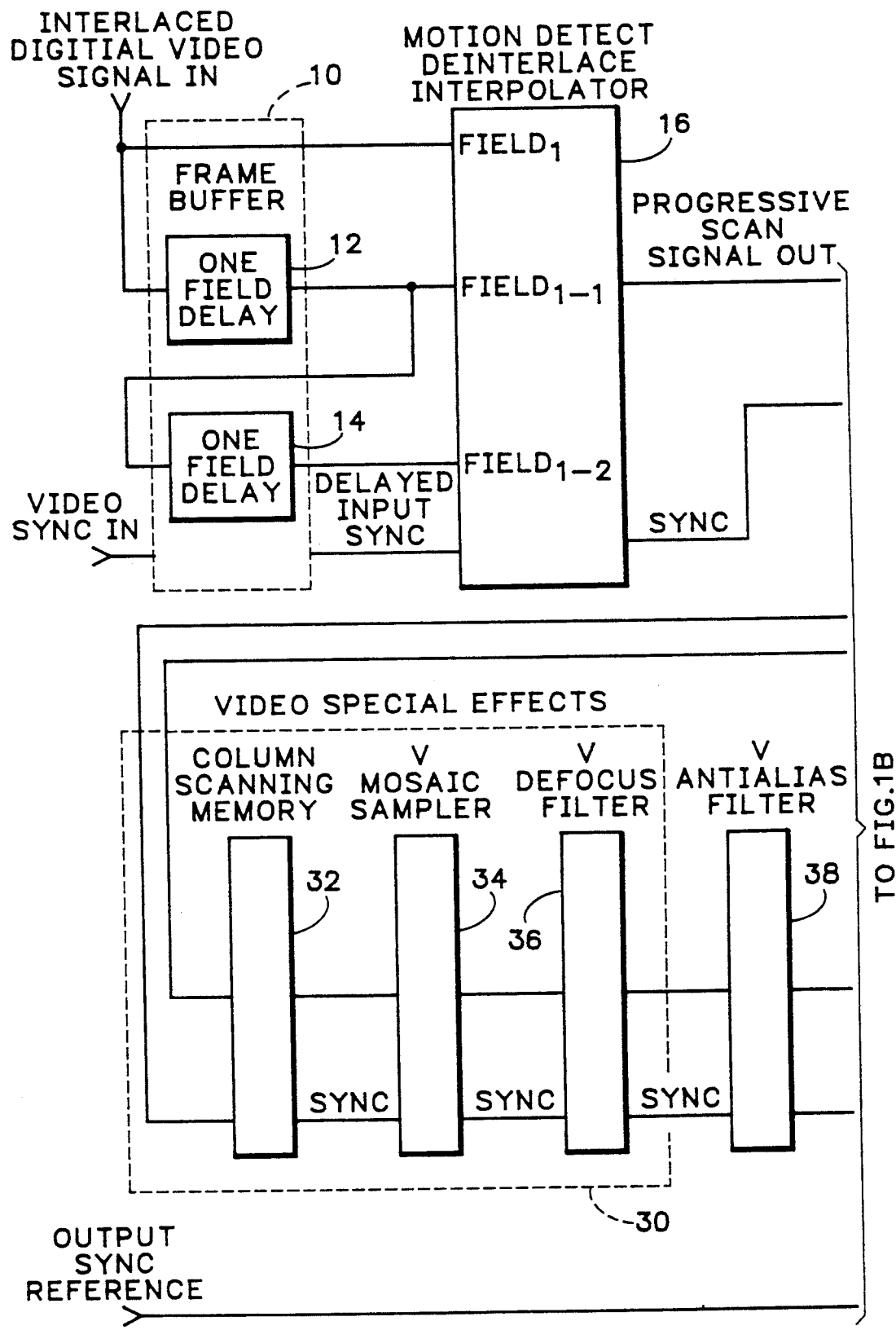
FIGS. 1A and 1B are block diagram of the progressive scanning section of a video special effects system according to the present invention.
Figure 1B:
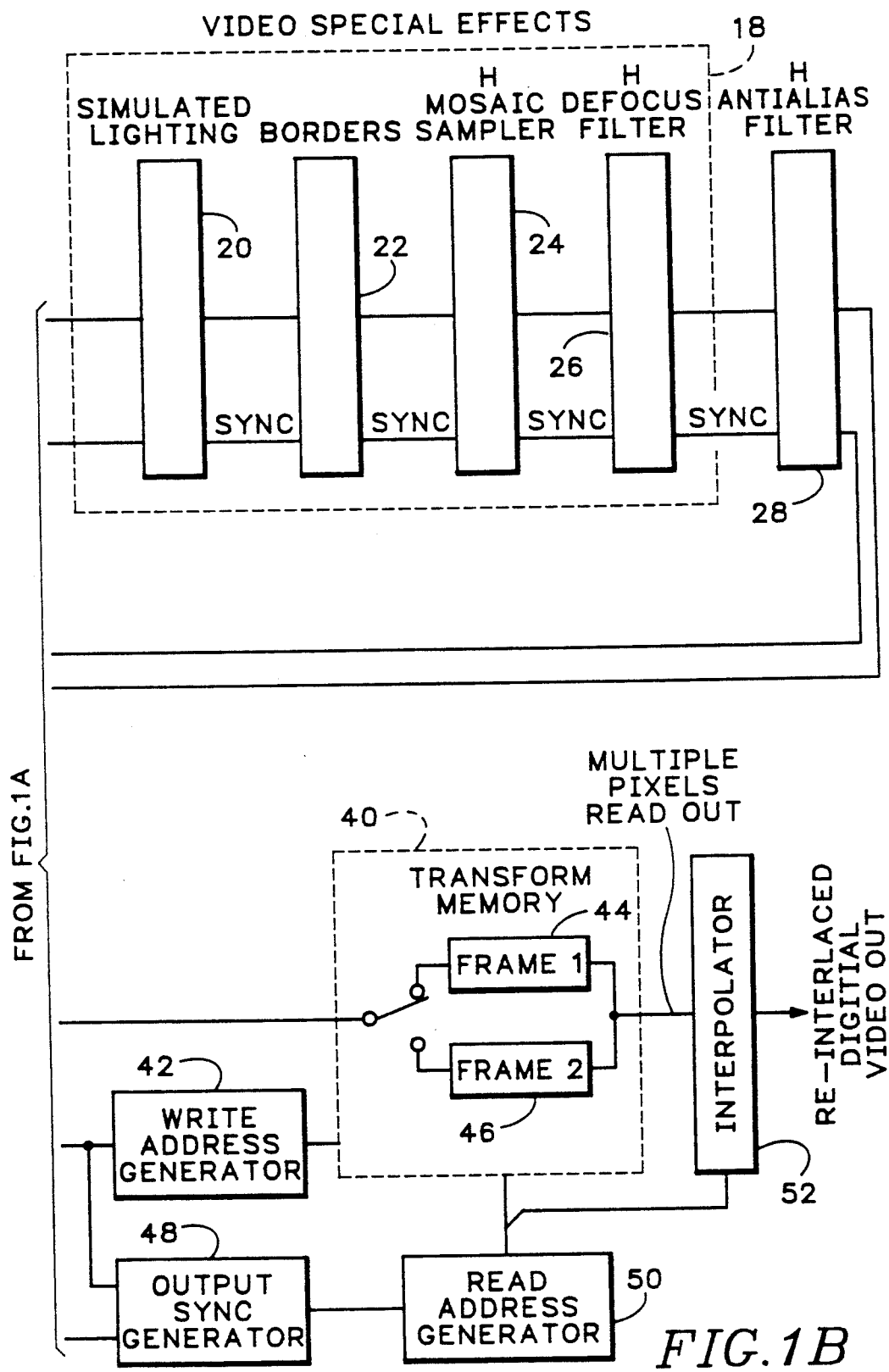

Referring now to the FIGURE, an interlaced digital video signal input is applied to a frame buffer 10 containing two one-field delay elements 12 and 14. The frame buffer 10 presents three fields of video to the motion detect deinterlace interpolator 16, field$_{last}$, field$_{last-1}$ and field$_{last-2}$.

The motion detecting deinterlace interpolator 16 suitably operates as described in U.S. Pat. No. 4,472,732 to Bennett et al, previously incorporated by reference, to produce a progressive scan video signal output.

The progressive scan video signal is then processed by two blocks of video special effects 18 and 30 and anti-aliasing filtered horizontally 28 and vertically 38. Within the first block of video special effects 18, the progressive scan video is applied first to a simulated lighting generator 20. Simulated lighting generation is known in the art, and a suitable method of performing this function is described in U.S. Pat. No. 4,899,295 to Nonweiler for "Video Signal Processing", hereby incorporated by reference.

The output of the simulated lighting generator 20 is applied to the input of borders generator 22. Borders generation is well known to those of ordinary skill in the video arts and is described in U.S. Pat. No. 4,698,666 to the present inventor for "Video Key Glow and Border Generator", hereby incorporated by reference.

The output of the borders generator 22 is applied to the input of horizontal mosaic sampler 24. Mosaics samplers are known in the art and a representative one is described in U.S. Pat. No. 4,782,388 to the present inventor for "Method and Apparatus for Providing Video Mosaic Effects", hereby incorporated by reference.

The output of the horizontal mosaic sampler 24 is applied to the input of horizontal defocus filter 26. Defocus filtering is well known to those of ordinary skill in the video arts, and merely consists of extreme low pass filtering.

The output of the horizontal defocus filter 26 is applied to the input of horizontal anti-aliasing filter 28. Anti-aliasing filters are known in the art, and a suitable one is described in U.S. Pat. No. 4,703,447 to the present inventor for "Mixer Controlled Variable Passband Finite Response Filter", hereby incorporated by reference. The output of the anti-aliasing filter 28 is then stored in column scanning memory 32.

The column scanning memory 32 re-orients the pixel transfer sequence from a horizontal scanning order to a vertical scanning order. The "transposing memories" described in U.S. Pat. No. 4,472,732 to Bennett et al, previously incorporated by reference, suitably perform this function.

As it is read out of the column scanning memory 32, the partially processed progressive scan video signal is sequentially applied to a vertical mosaic sampler 34, a vertical defocus filter 36 and a vertical anti-aliasing filter 38.

As this progressive scan video signal stream is processed through the blocks above, the bandwidth requirements for each of those blocks is doubled. As each of these blocks has been explained by reference to a prior art patent or by being described as "well known to those of ordinary skill in the video art", it should be borne in mind that some adaptation will be required to handle twice as much data. Whether this can most effectively be done by doubling the width of the data path or by using faster parts and doubling the speed of the data path, will depend on price tradeoffs and practical considerations in the local design environment.

The fully processed progressive scan video signal is then put in either a frame 1 memory 44 or a frame 2 memory 46, which together constitute a transform memory 40.

A write address generator 42 receives sync signal inputs and produces the addresses that write the fully processed progressive scan video signals into the transform memory 40. The sync signal inputs to the write address generator 42 have been used and delayed appropriately by each of the blocks 20–38 along the video processing path. Each block receives, uses and appropriately delays these sync signals, so that blocks downstream are unaffected by design changes or operating mode changes in the blocks that are upstream from them.

The output sync generator 48 receives output sync references and the delayed input sync signals accompanying the video. It needs the latter in case the output sync references are not present for some reason and it is necessary to use the delayed input sync signals instead. It is also necessary to measure the relative timing difference between the delayed input video sync signals and the output sync reference. While some time is available to compensate for timing differences, if the measured difference is larger than the maximum time available for this purpose, it is necessary to detect that condition and notify the operator.

The output sync generator 48 supplies the read address generator 50 with output sync signals. The read address generator 50 produces read addresses according to the desired transform function, such as sizing, positioning, rotation, perspective, projection, warping, etc., and supplies the integer part of these pixel addresses to the transform memory 40. The fractional parts of these addresses are supplied to the interpolator 52. The read address generator 50 reads from the opposite frame 1 or 2 memory 44, 46 from the one that is presently being written to by the write address generator 42. The synchronization of the writing and reading of the two frame memories 44 and 46 is maintained by the vertical blanking signal which identifies the end of a field and causes the alternation between reading and writing of the two frames. Interlacing is reintroduced in this reading out process.

Although not shown in the FIGURE, key glow filtering may be accomplished in a separate parallel channel, as described in U.S. Pat. No. 4,698,666 to the present inventor for "Video Key Glow and Border Generator", previously incorporated by reference.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope of the invention.

I claim:

1. A video special effects system for receiving an interlaced input video signal having a predetermined line rate, said video special effects system comprising:
   a deinterlace filter with motion detection for producing a first progressive scan video signal from the interlaced input video signal;
   video special effect generating means for operating on the progressive scan video signal to produce a progressive scan video signal with special effect such that the image represented by the progressive scan video signal with special effect is substantially different from the image represented by the interlaced input video signal; and
   means for interlacing the progressive scan video signal with special effect to produce an interlaced video output signal with special effect and having said predetermined line rate.

2. A system according to claim 1, wherein the video special effect generating means comprise at least one of the following:
   simulated lighting generator;
   borders generator;
   defocus effects generator; and mosaic tiling generator.

3. A system according to claim 1, comprising means for anti-alias filtering the progressive scan video signal with special effect.

4. A system according to claim 1, wherein the first progressive scan video signal is a progressive horizontal scan video signal and the video special effect generating means comprise means for applying a horizontal special effect to the progressive horizontal scan video signal to produce a progressive horizontal scan video signal with horizontal special effect, means for converting the progressive horizontal scan video signal with horizontal special effect to a progressive vertical scan video signal with horizontal special effect, and means for applying a vertical special effect to the progressive vertical scan video signal with horizontal special effect to produce a progressive vertical scan video signal with horizontal and vertical special effects, and wherein the means for interlacing the progressive scan video signal with special effects comprise means for converting the progressive vertical scan video signal with horizontal and vertical special effects into a horizontal scan interlaced video signal with horizontal and vertical special effects.

5. A system according to claim 4, comprising horizontal anti-alias filter means for anti-alias filtering the progressive horizontal scan video signal with horizontal special effect, and vertical anti-alias filter means for anti-alias filtering the progressive vertical scan video signal with horizontal and vertical special effects.

6. A system according to claim 1, wherein the video special effect generating means comprise at least one of the following:
   borders generator;
   defocus effects generator; and
   mosaic tiling generator.

7. A system according to claim 4, wherein the means for applying a horizontal special effect to the progressive horizontal scan video signal comprise at least one of the following:
   simulated lighting generator;
   borders generator;
   defocus effects generator; and mosaic tiling generator,
and the means for applying a vertical special effect to the progressive vertical scan video signal with horizontal special effect comprise at least one of the following:
   defocus effects generator; and
   mosaic tiling generator.

8. A system according to claim 7, wherein the means for applying a horizontal special effect to the progressive horizontal scan video signal comprises a defocus effects generator and a mosaic tiling generator, and the means for applying a vertical special effect to the progressive vertical scan video signal with horizontal special effect comprise a defocus effects generator and a mosaic tiling generator.

9. A method for producing video special effects, the method comprising the steps of:
   deinterlace filtering with motion detection an interlaced video input signal having a predetermined line rate to produce a first progressive scan video signal;
   applying a video special effect to the first progressive scan video signal to produce a progressive scan video signal with special effect such that the image represented by the progressive scan video signal with special effect is substantially different from the image represented by the interlaced input video signal; and
   interlacing the progressive scan video signal with special effect to produce an interlaced video output signal with special effects and having said predetermined line rate.

10. A method according to claim 9, wherein the video special effect comprises at least one of the following steps:
   generating simulated lighting;
   generating borders;
   generating defocus effects; and
   generating mosaic tiling.

11. A method according to claim 9, comprising the step of anti-alias filtering the progressive scan video signal with special effect.

12. A method according to claim 9, wherein the first progressive scan video signal is a progressive horizontal scan video signal and the method comprises applying a horizontal special effect to the progressive horizontal scan video signal to produce a progressive horizontal scan video signal with horizontal special effect, converting the progressive horizontal scan video signal with horizontal special effect to a progressive vertical scan video signal with horizontal special effect, applying a vertical special effect to the progressive vertical scan video signal with horizontal special effect to produce a progressive vertical scan video signal with horizontal and vertical special effects, and converting the progressive vertical scan video signal with horizontal and vertical special effects into a horizontal scan interlaced video signal with horizontal and vertical special effects.

13. A method according to claim 12, further comprising horizontal anti-alias filtering the progressive horizontal scan video signal with horizontal special effect and vertical anti-alias filtering the progressive vertical scan video signal with horizontal and vertical special effects.

14. A method according to claim 9, wherein the video special effect comprises at least one of the following steps:
   generating borders;
   generating defocus effects; and
   generating mosaic tiling.

15. A method according to claim 12, wherein the step of applying a horizontal special effect to the progressive horizontal scan video signal comprises at least one of the following steps:
   generating simulated lighting;
   generating borders;
   generating defocus effects; and
   generating mosaic tiling, and the step of applying a vertical special effect to the progressive vertical scan video signal with horizontal special effect comprises at least one of the following:
   generating defocus effects; and
   generating mosaic tiling.

* * * * *